United States Patent
Lee et al.

(10) Patent No.: US 9,014,289 B2
(45) Date of Patent: Apr. 21, 2015

(54) TRANSMISSION METHOD FOR DUAL DIGITAL SIGNAL THROUGH SINGLE ANTENNA, TRANSMITTER FOR DUAL DIGITAL SIGNAL THROUGH SINGLE ANTENNA AND RECEIVING METHOD FOR DUAL DIGITAL SIGNAL THROUGH SINGLE ANTENNA

(71) Applicant: GCT Semiconductor, Inc., San Jose, CA (US)

(72) Inventors: Eal Wan Lee, Seoul (KR); Dae Hong Kim, Seongnam-si (KR); Jeong Min Kim, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 0 days.

(21) Appl. No.: 14/064,196

(22) Filed: Oct. 28, 2013

(65) Prior Publication Data

US 2014/0226754 A1    Aug. 14, 2014

(30) Foreign Application Priority Data

Feb. 14, 2013   (KR) .................. 10-2013-0015787

(51) Int. Cl.
*H04B 7/02* (2006.01)
*H04L 25/08* (2006.01)
*H04L 27/26* (2006.01)
*H04B 7/04* (2006.01)

(52) U.S. Cl.
CPC ............... *H04L 25/08* (2013.01); *H04L 27/26* (2013.01); *H04B 7/028* (2013.01); *H04B 7/0413* (2013.01)

(58) Field of Classification Search
CPC . H04L 27/26; H04L 27/2614; H04L 27/2623; H04L 25/08; H04B 7/0413; H04B 7/028
USPC ......... 375/260, 267, 271, 295, 298, 299, 302, 375/316, 320, 340; 455/63.1
See application file for complete search history.

(56) References Cited

U.S. PATENT DOCUMENTS

| | | |
|---|---|---|
| 7,274,653 B1 | 9/2007 | Settle et al. |
| 8,259,848 B2 | 9/2012 | Malladi |
| 2010/0311343 A1* | 12/2010 | Keerthi ................. 455/63.1 |

FOREIGN PATENT DOCUMENTS

KR    10-2011-0001464 A    1/2011

OTHER PUBLICATIONS

Office Action from the Korean Patent Office, issued on Apr. 29, 2013.

(Continued)

*Primary Examiner* — Leon Flores
(74) *Attorney, Agent, or Firm* — Muir Patent Consulting, PLLC (57) ABSTRACT

Disclosed is a method of transmitting dual digital signals through a single antenna. The method includes receiving, by a transmitter, a first data stream and a second data stream which use the same carrier frequency, modulating, by the transmitter, each of the first data stream and the second data stream, lowering, by the transmitter, a power level of the modulated second data stream, combining, by the transmitter, the modulated first data stream and the second data stream with the lowered power level, and transmitting, by the transmitter, the added first data stream and second data stream to a single antenna in the same channel.

20 Claims, 7 Drawing Sheets

(56) References Cited

OTHER PUBLICATIONS

A. Shertz and C. Weck, 'Hierarchical modulation—the transmission of two independent DVB-T multiplexes on a single frequency', EBU Techn. Rev., Apr. 2003.

H. Jiang and P. Wilford, 'A hierarchical modulation for upgrading digital broadcast systems', IEEE Transactions on broadcasting, 2005, vol. 51, No. 2, pp. 223-229.

* cited by examiner

TRANSMISSION METHOD FOR DUAL DIGITAL SIGNAL THROUGH SINGLE ANTENNA, TRANSMITTER FOR DUAL DIGITAL SIGNAL THROUGH SINGLE ANTENNA AND RECEIVING METHOD FOR DUAL DIGITAL SIGNAL THROUGH SINGLE ANTENNA

CROSS-REFERENCE TO RELATED APPLICATION

This application claims priority to and the benefit under 35 U.S.C. §119(a) of Korean Patent Application No. 2013-0015787, filed on Feb. 14, 2013, in the Korean Intellectual Property Office, the entire disclosure of which is incorporated herein by reference for all purposes.

BACKGROUND

1. Field of the Invention

The following description relates to a method of transmitting a digital signal, a transmitter, and a method of receiving a transmitted signal in a receiver.

2. Discussion of Related Art

In general, transmission of digital signals has advantages in that it is less sensitive to noise and has less distortion and high transmission efficiency compared to analog signals, but at the same time, has disadvantages in that it requires a broad bandwidth and has a complex system. Despite these disadvantages, a digital method has been widely used in these days due to relatively fewer errors, high reliability, and development of circuit technology that has been made in recent days.

In digital communication, a transmitter modulates data to be suitable for transmission prior to transmission of the data, and a receiver demodulates original data signals from transmitted signals. In general, a demodulation in the receiver can be thought as an inverse of a modulation.

Communication using digital signals is used in various fields such as wireless communication, digital broadcasting, and the like. As a modulation method in a wireless communication field, there may be used various methods such as a method of modulating only a phase such as quadrature phase shift keying (QPSK), a method of modulating a phase and an amplitude such as quadrature amplitude modulation (QAM), and the like.

In the wireless communication field, much research has been conducted for better spectral efficiency with limited resources. As one of these methods, a multiple-input multiple-output (MIMO) method may be given.

The MIMO method is based on input and output of signals using a plurality of antennas. This method is characterized in that a plurality of data streams are transmitted simultaneously on the same channel using a plurality of antennas different from each other. As the number of channels is increased, the channel capacity is increased in proportion to the number of channels, and therefore it is possible to actually improve the speed of communication link. In addition, this method has an advantage in that the channel bandwidth is not increased while improving the throughput.

However, the MIMO technique has limitations in that a plurality of antennas should be used and costs for additional devices may be required. In addition, a small device such as a mobile terminal may have a spatial limitation in its use of the plurality of antennas and an additional configuration. Moreover, interference between channels is a problem to be solved for the design of receiver.

SUMMARY OF THE INVENTION

In one general aspect, there is provided a method of transmitting dual digital signals through a single antenna for multiple-input multiple-output (MIMO) digital signal transmission methods, the method including: getting, by a transmitter, a first data stream and a second data stream which use the same carrier frequency from a single encoder; modulating, by the transmitter, each of the first data stream and the second data stream; lowering, by the transmitter, a pilot/data power level of the modulated second data stream; merging, by the transmitter, the modulated first data stream and the second data stream with the lowered power level; and transmitting, by the transmitter, the added first data stream and second data stream through a single antenna in the same channel.

Here, the lowering may include lowering, by the transmitter, the power level to a range in which interferences from the second data stream to the modulated first data stream are to be negligible.

Also, the modulating may include modulating, by the transmitter, each of the first data stream and the second data stream using a 16 quadrature amplitude modulation (QAM) method, and the lowering includes lowering, by the transmitter, the power level to ¼ or less.

Also, the lowering may include lowering, by the transmitter, the power level to −13 dB to −14 dB.

Also, the modulating may include modulating, by the transmitter, each of the first data stream and the second data stream using a quadrature phase shift keying (QPSK) method, and the lowering includes lowering, by the transmitter, the power level to ½ or less.

Also, the lowering may include lowering, by the transmitter, the power level to −7 dB to −8 dB.

In another general aspect, there is provided a multiple-input multiple-output (MIMO) digital signal transmitter including: a modulation unit configured to modulate each of a first data stream and a second date stream which use the same carrier frequency; a buffer unit configured to lower the power level of the second data stream output from the modulation unit; an addition unit configured to add the first data stream output from the modulation unit and the second date stream output from the buffer unit; a conversion unit configured to convert a signal output from the addition unit in a single channel; and a transmission unit configured to transmit the signal output from the conversion unit through a single antenna.

Here, the buffer unit may lower the power level of the second data stream to a range in which the second data stream output from the modulation unit do not interfere with the first data stream.

Also, the modulation unit may include a first modulation unit configured to modulate the first data stream using a 16 QAM method, and a second modulation unit configured to modulate the second data stream using the 16 QAM method.

Also, the buffer unit may lower the power level of the second data stream output from the second modulation unit to ¼ or less.

Also, the buffer unit may lower the power level to −13 dB to −14 dB.

Also, the modulation unit may include a first modulation unit configured to modulate the first data stream using a QPSK method, and a second modulation unit configured to modulate the second data stream using the QPSK method.

Also, the buffer unit may lower the power level of the second data stream output from the second modulation unit to ½ or less.

Also, the buffer unit may lower the power level to −7 dB to −8 dB.

Also, the conversion unit may include an inverse fast Fourier transform (IFFT) unit configured to convert an orthogonal frequency division multiplexing (OFDM) signal of a frequency domain into an OFDM signal of a time domain, a guard interval (GI) insertion unit configured to insert a guard interval into a signal output from the IFFT unit, a filter unit configured to filter a signal output from the GI insertion unit, a digital-to-analog converter (DAC) unit configured to convert a signal output from the filter unit into an analog signal, and a radio frequency (RF) unit configured to convert a signal output from the DAC unit into an RF signal.

In yet another general aspect, there is provided a method of receiving dual digital signals through a single antenna, the method including: receiving, by a receiver, an RF signal including a first data stream and a second data stream with unequal power levels; separating, by the receiver, the first data stream and the second data stream from the RF signal based on the unequal power levels; and demodulating, by the receiver, the first data stream and the second data stream.

Here, the power level of the first data stream may be 0 dB, and the power level of the second data stream may be a value that is lowered to a range so that the interference from the second data stream to the first data stream are to be negligible.

Also, when a modulation method of the data stream is QPSK, the power level of the second data stream may be a value lowered to −7 dB to −8 dB, and when the modulation method of the data stream is QAM, the power level of the second data stream may be a value lowered to −13 dB to −14 dB.

Also, the demodulating may include demodulating the first data stream and the second data stream successively, and compensating for a delay of the second data stream which occurs by the successive demodulation.

Also, the method may further include estimating the power ratio of the first and second data streams using the channel coefficient estimates, and refining a channel estimation value of the first data stream and the second data stream using the power ratio.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. Unless the context indicates otherwise, these terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described with reference to the accompanying drawings.

In addition, in performing a method or an operational method, each process constituting the method may be performed in an order different from a specified order as long as a specific order is not explicitly and contextually specified. For example, each process may be performed in the same order as the specified order, performed substantially simultaneously, or performed in reverse order.

The disclosed embodiments are characterized by a method of transmitting digital signals and a digital signal transmitter. In addition, the disclosed embodiments include a method of receiving signals transmitted by the digital signal transmission method and a receiver.

Related research are as follows, (1) A. Shertz and C. Weck, 'Hierarchical modulation—the transmission of two independent DVB-T multiplexes on a single frequency', EBU Techn. Rev., April 2003; (2) H. Jiang and P. Wilford, 'A hierarchical modulation for upgrading digital broadcast systems', IEEE Transactions on broadcasting, 2005, vol. 51, no. 2, pp. 223-229; (3) D. Malladi, "Hierarchical Modulation for Communication Channels in Single-Carrier Frequency Division Multiple Access", U.S. Pat. No. 8,259,848, published Sep. 4, 2012; and (4) T. Settle, T. Krauss and J. Ramaswamy, "Hierarchical QAM transmission system with varying grouping factor," U.S. Pat. No. 7,274,653, published Sep. 25, 2007, all of which are incorporated herein by reference in their entirety.

The term "digital signal" may be used as various meanings In the disclosed embodiments, the digital signals mainly refer to signals transmitted via wireless communication channel. Thus, these digital signals include communication signals used in wireless communication using a mobile terminal and a base station, signals used in a digital broadcast, wireless LAN signals transmitted from a base station (STA) or an access point (AP) to a terminal, and the like. Signals used in these systems are generally referred to herein as "digital communication signals."

As described above, a multiple-input multiple-output (MIMO) method is based on input and output of signals using a plurality of antennas. The MIMO method transmits a data stream (digital signals) using at least two antennas. In certain disclosed embodiments, a structure of a device for transmitting a data stream using two antennas is simplified to transmit two data streams using a single antenna. For this, data streams may be mapped into a single data stream to be transmitted.

In certain embodiments, it is desirable to apply such a method to a device basically using the MIMO method. Most current MIMO methods may be implemented as an orthogonal frequency division multiplexing (OFDM) method.

The OFDM method is a method of increasing frequency utilization efficiency using a plurality of carrier frequencies having mutual orthogonality. In the OFDM method, the frequency utilization efficiency may be increased using the plurality of sub-carrier frequencies having mutual orthogonality, and a method of modulating and demodulating the plurality of sub-carrier frequencies in a transmission terminal and a reception terminal, respectively, may be implemented using inverse fast Fourier transform (IFFT) and fast Fourier transform (FFT) which are results obtained by performing inverse discrete Fourier transform (IDFT) and discrete Fourier transform (DFT).

Hereinafter, description of the OFDM method or a general method or device widely used in a communication field will be omitted or simple description thereof will be made, and features of the present embodiments will be centrally described. However, the person having ordinary skill in the art will fully understand the omitted description through currently published literatures or the like.

In addition, the present invention is not necessarily applied to only an example of using communication in an OFDM method or communication in an MIMO method. Specifically, although described more later, certain disclosed embodiments enable efficient data transmission basically through a single antenna, and thereby are applicable to even other fields or other digital signal transmission methods.

In certain embodiments, a communication method described herein could be applied to either cellular communication or wireless LAN (WLAN) communication fields.

Hereinafter, a method of transmitting digital signals, a digital signal transmitter 100, a method of receiving digital signals, and a digital signal receiver 200 will be described in detail with reference to the accompanying drawings.

Figure 1:
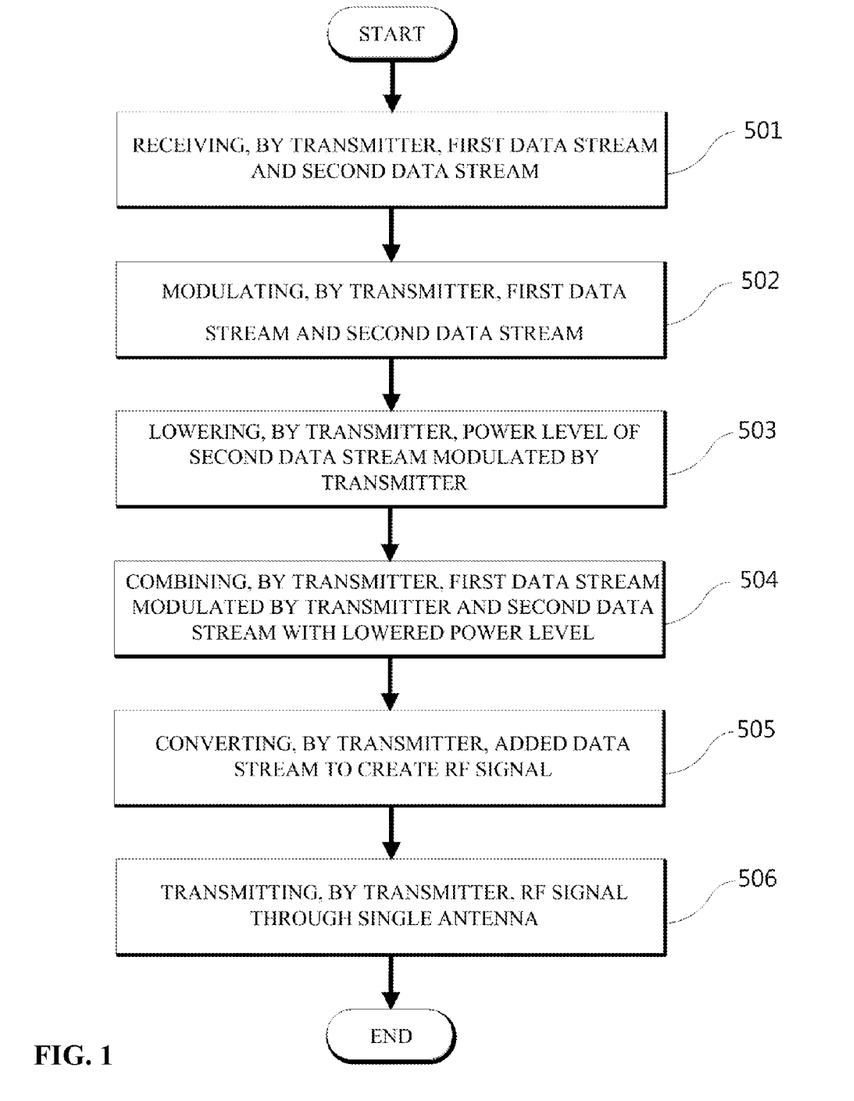
FIG. 1 is a schematic flowchart illustrating an example of a digital signal transmission method.

FIG. 1 is a schematic flowchart illustrating an example of a dual digital signal transmission method through a single antenna. The dual digital signal transmission method through the single antenna includes getting, by a transmitter, a first data stream and a second data stream in operation S501, modulating, by the transmitter, each of the first data stream and the second data stream in operation S502, lowering, by the transmitter, a power level of the second data stream, modulated by the transmitter, in operation S503, merging, by the transmitter, the modulated first data stream and the second data stream with the lowered power value in operation S504, and transmitting, by the transmitter, the added first data stream and second data stream through a single antenna on the same channel in operation. The added data stream is generally converted into RF signals through an up-converter in operation S505, and then transmitted through an antenna of the transmitter in operation S506.

In the lowering operation of S503, the transmitter lowers the power level of the modulated second data stream to a range in which the interference of the second data stream is negligible to the decoding of the first data stream.

Figure 2:
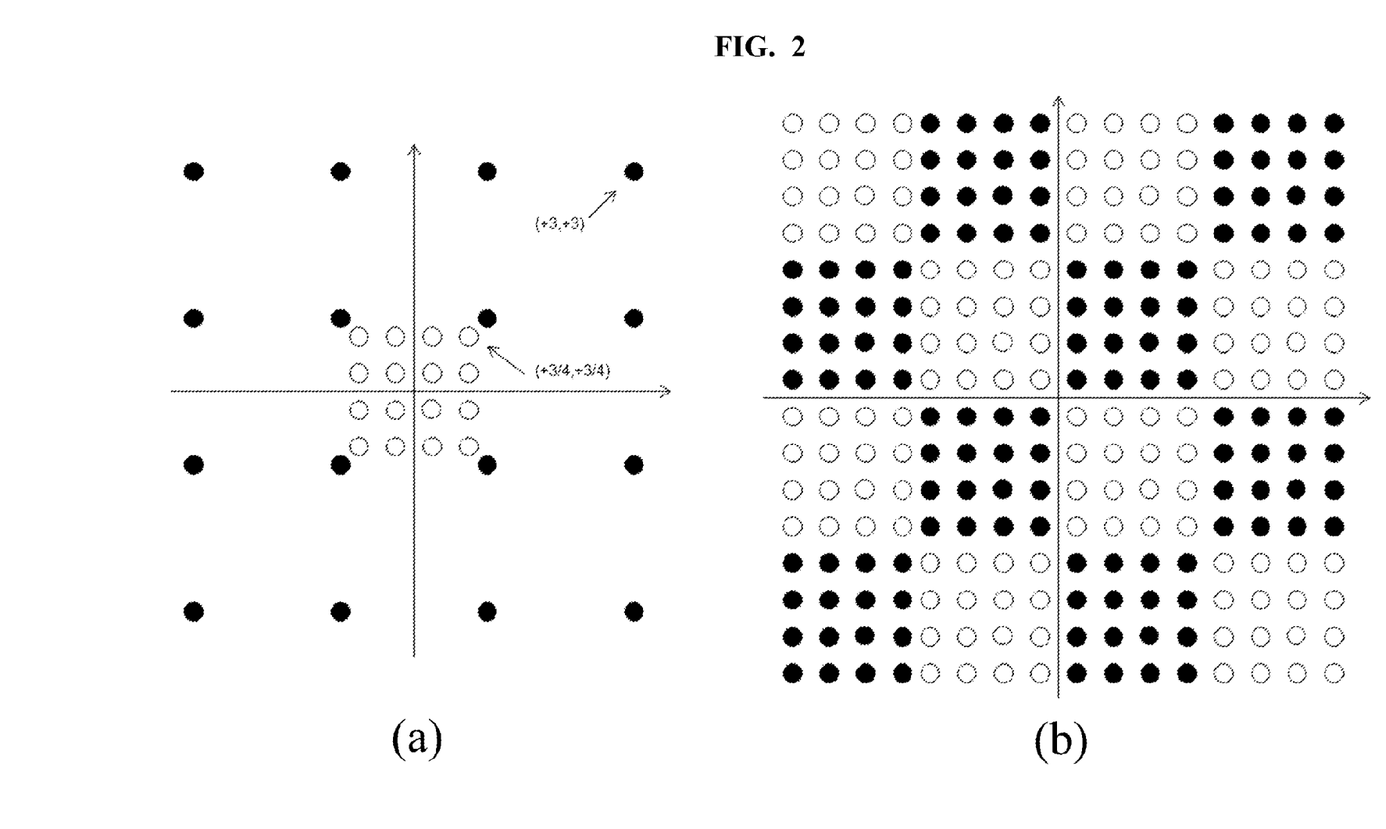
FIGS. 2A and 2B are diagrams illustrating an example of constellation with respect to a first data stream and a second data stream with a lowered power level.

FIGS. 2A and 2B are diagrams illustrating an example of constellation with respect to a first data stream and a second data stream with a lower power level. FIG. 2A is a constellation diagram illustrating an example in which the power level of a second data stream is lowered from that of a data stream modulated in a 16 quadrature amplitude modulation (QAM) method, and FIG. 2B is a constellation diagram illustrating a 256 QAM method or the constellation when the power ratio of the second data is exactly ¼.

Referring to FIG. 2A, a first data stream is 0 dB in which there is no change in a power level, and the second data stream is about −12 dB in which a power level is lowered. In the 16 QAM method, when the second data stream is lowered to ¼ or less and noise is smaller than the second data stream, two signals may be accurately separated from a single signal with two added data streams later in the receiver side. In FIG. 2A, a coordinate value given in parentheses corresponds to a mapping value with respect to a target indicated by an arrow.

As shown in FIG. 2A, when the power level of the second data stream is lowered, the constellation of the second data stream does not overlap with each other for arbitrary first data point and can be transmitted as a single signal. In one embodiment, two data streams are processed as a single signal to be transmitted, and therefore the dual 16 QAM data stream as shown in FIG. 2A can be thought as the 256 QAM-equivalent shown in FIG. 2B.

Although not shown, the disclosed embodiments may be applicable in other modulation methods. For example, the disclosed embodiments may be applicable in a quadrature phase shift keying (QPSK) modulation. In the QPSK modulation, the power level of the second data stream is lowered to about ½ or less. Theoretically, two data streams may be overlapped to be transmitted when the power level of the second data stream is larger than ½ but smaller than the power level of the first data stream.

The power level of the second data stream may be lowered so as not to interfere with the first data stream. However, when the power level is excessively lowered, there arises a limitation in a range where signals can be transmitted, and therefore it is important that the power level is appropriately lowered in the lowering operation of S503.

Figure 3:
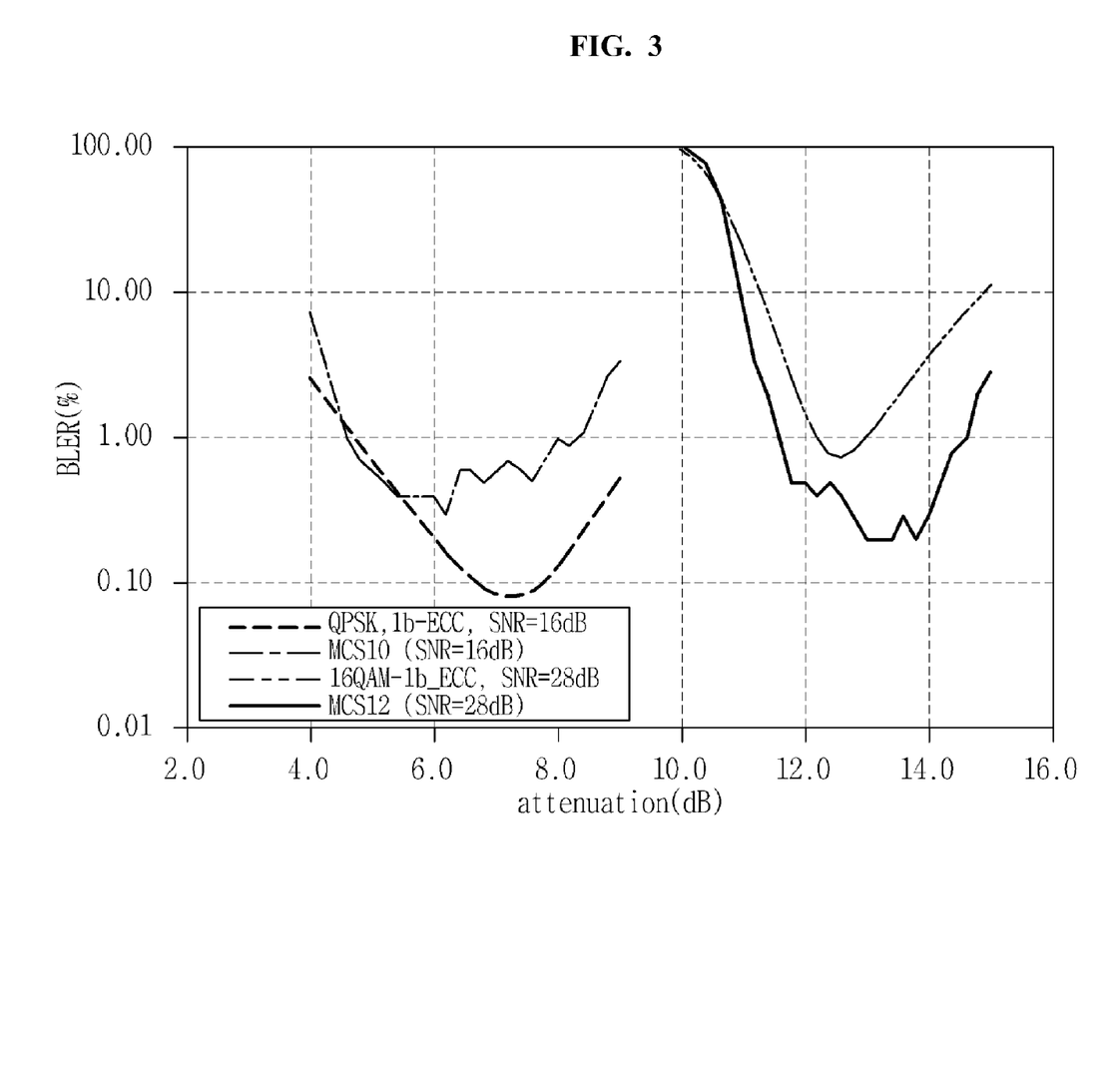
FIG. 3 is a graph illustrating an example of results obtained by measuring a block error rate (BLER) for determining an optimum lowering ratio of the power level of a second data stream.

FIG. 3 is a graph illustrating an example of results obtained by measuring a block error rate (BLER) for determining an optimum lowering ratio of a second data stream power. In the graph shown in FIG. 3, a horizontal axis indicates a power ratio, and a vertical axis indicates a BLER.

In FIG. 3, the plot on the left for lower SNR shows BLER results with respect to signals using a QPSK modulation in an environment while SNR is set to 16 dB, and the plot on the right for higher SNR shows BLER results with respect to signals using a 16 QAM modulation in an environment while SNR is set to 28 dB. Modulation and coding schemes (MCS) 10 and 12 may denote a method in accordance with a standard defined in IEEE 802.11n. In the QPSK modulation, the optimum BLER is found where the second data stream is lowered slightly below −6 dB, and in the 16 QAM modulation, the optimum BLER is found where the second data stream is lowered slightly below −12 dB.

In accordance with the results of FIG. 3, in both the QPSK modulation and the 16 QAM modulation, the optimal power ratio of the second data stream is 1 to 2 dB below the nominal power ratio.

Thus, in the modulating of operation S502, when the transmitter modulates each of the first data stream and the second data stream in the 16 QAM modulation, it is desirable that the transmitter lowers the power level to −13 to −14 dB in the lowering operation of S503. In addition, when the transmitter modulates each of the first data stream and the second data stream in the QPSK modulation in the modulating of operation S502, it is preferable that the transmitter lowers the power level to −7 to −8 dB in the lowering operation of S503.

Figure 4:
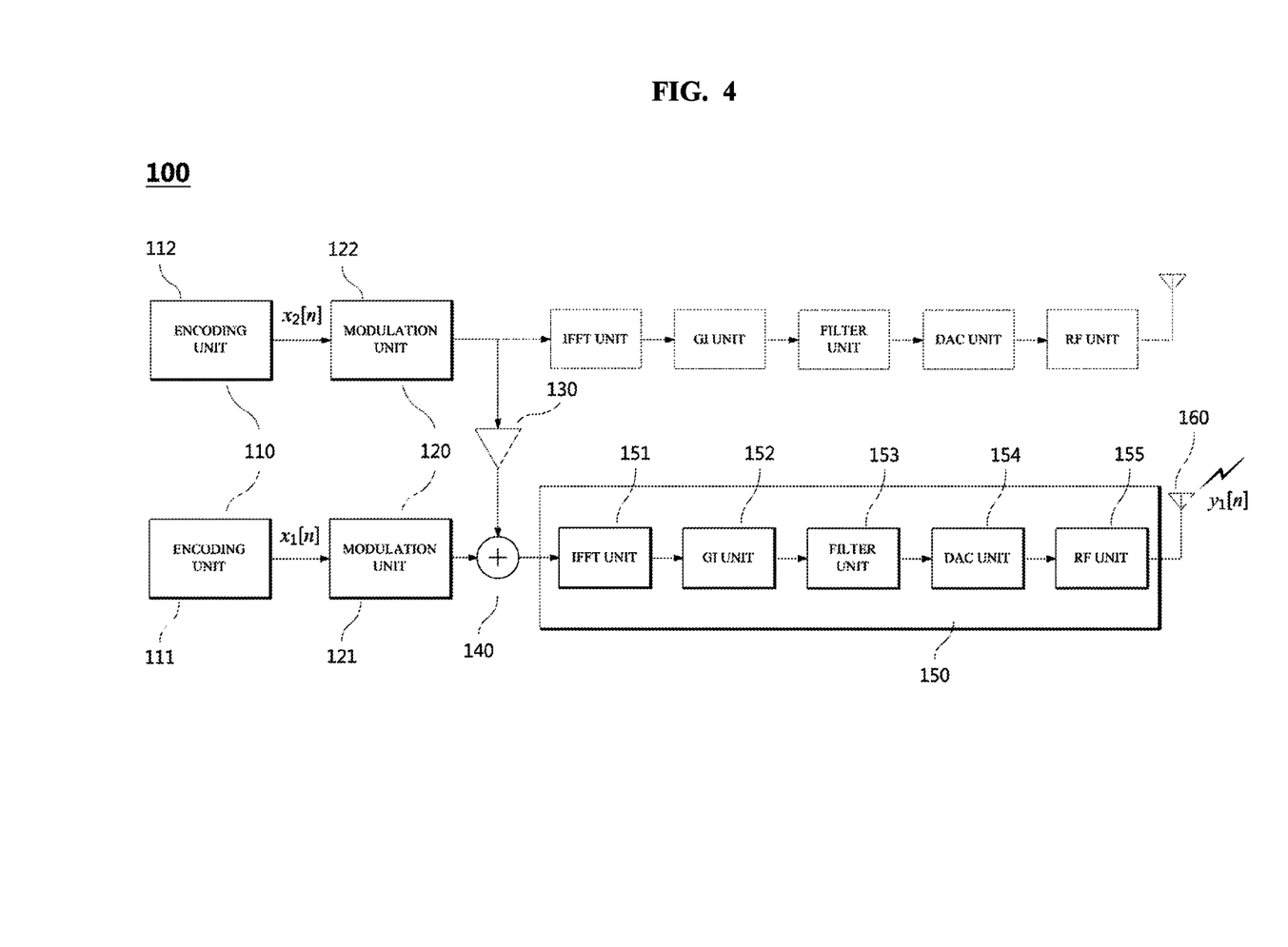
FIG. 4 is a schematic block diagram illustrating an example of a configuration of a digital signal transmitter.

FIG. 4 is a schematic block diagram illustrating an example of a configuration of a dual digital signal transmitter 100 through a single antenna. The dual digital signal transmitter 100 through the single antenna includes an encoding unit 110 to encode data to be transmitted to output a code symbol, a modulation unit 120 to modulate each of encoded first and second data streams, a buffer unit 130 to lower the power level of the second data stream output from the modulation unit 120, an addition unit 140 to add the first data stream output from the modulation unit 120 and the second data stream output from the buffer unit 130, a conversion unit 150 to convert signals output from the addition unit 140 in a single channel, and a transmission unit 160 to transmit signals output from the conversion unit 150 through a single antenna.

The encoding unit 110 encodes data to be transmitted at a coding rate in accordance with an MCS level to output code symbols. For example, the encoding unit 110 may include a convolutional encoder, a turbo encoder, a low density parity check encoder (LDPC), and the like.

The modulation unit 120 modulates symbols encoded in the encoding unit 110 in accordance with a modulation type. As the modulation type, various modulations such as BPSK, QPSK, 16 QAM, 64 QAM, and the like may be used.

The buffer unit 130 may have a configuration of lowering a power level of the second data stream. Various configurations may be used. In one embodiment, a configuration such as a buffer gate may be used. The buffer unit 130 lowers the power level of the second data stream to a range in which the first data stream output from the modulation unit 120 is not interfered with the second data stream. The buffer unit 130 lowers power level of the second data stream in accordance with a modulation type as described above.

The modulation unit 120 includes a first modulation unit 121 to modulate the first data stream in the 16 QAM modulation and a second modulation unit 122 to modulate the second data stream in the 16 QAM modulation. The first data stream ($x_1[n]$) and the second data stream ($x_2[n]$) are encoded in parallel to be modulated. The encoding unit 110 includes a first encoding unit 111 to encode the first data stream and a second encoding unit 112 to encode the second data stream.

Next, a power level of the second data stream modulated in the second modulation unit 122 is lowered in the buffer unit 130 by the factor of a, and in the addition unit 140, the second data stream with a lowered power level and the first data stream modulated in the first modulation unit 121 are merged.

The data stream $((x_1[n])+\alpha\cdot(x_2[n]))$ added in the addition unit 140 is converted in a single conversion unit 150, and transmitted in the transmission unit 160 including a single antenna. Thus, the merged data stream may be transmitted through a single channel.

The transmitter 100 according to certain disclosed embodiments may be simpler than a transmitter having two antennas in the hardware complexity because the transmitter 100 does not need a conversion unit to process a single data stream. A conversion unit shown by a dotted line in FIG. 4 corresponds to this.

The conversion unit 150 corresponds to a general configuration included in the transmitter. Various configurations that may be used by the person having ordinary skill in the art may be used. However, the conversion unit 150 using an OFDM method includes an IFFT unit 151 to convert an OFDM signal of a frequency domain into an OFDM signal of a time domain, a guard interval (GI) insertion unit 152 to insert a guard interval into signals output from the IFFT unit, a filter unit 153 to filter signals output from the GI insertion unit, a digital-to-analog converter (DAC) unit 154 to convert signals output from the filter unit into analog signals, and a radio frequency (RF) unit 155 to convert signals output from the DAC unit into RF signals.

The IFFT unit 151 performs IFFT on data to output sample data. The output sample data is provided to the GI insertion unit 152 to insert the GI. As the GI, various data may be used in accordance with a communication method. In general, a cyclic prefix (CP) or the like may be used.

The signal in which the GI is inserted may pass through the filter unit 153 such as a pulse shaping filter (PSF), and be converted into analog signals through the DAC unit. Next, the analog signals are converted into RF signals through the RF unit 155 corresponding to a device such as an upconverter, and transmitted through the transmission unit 160 including a single transmission antenna.

FIG. 4 shows only a case in which a single conversion unit and transmission unit are removed from a transmitter having two antennas. As such, a structure with two antennas is simplified to a structure with a single antenna. In other embodiments, however, a transmitter using four antennas may be simplified to a transmitter using two antennas, etc.

Figure 5:
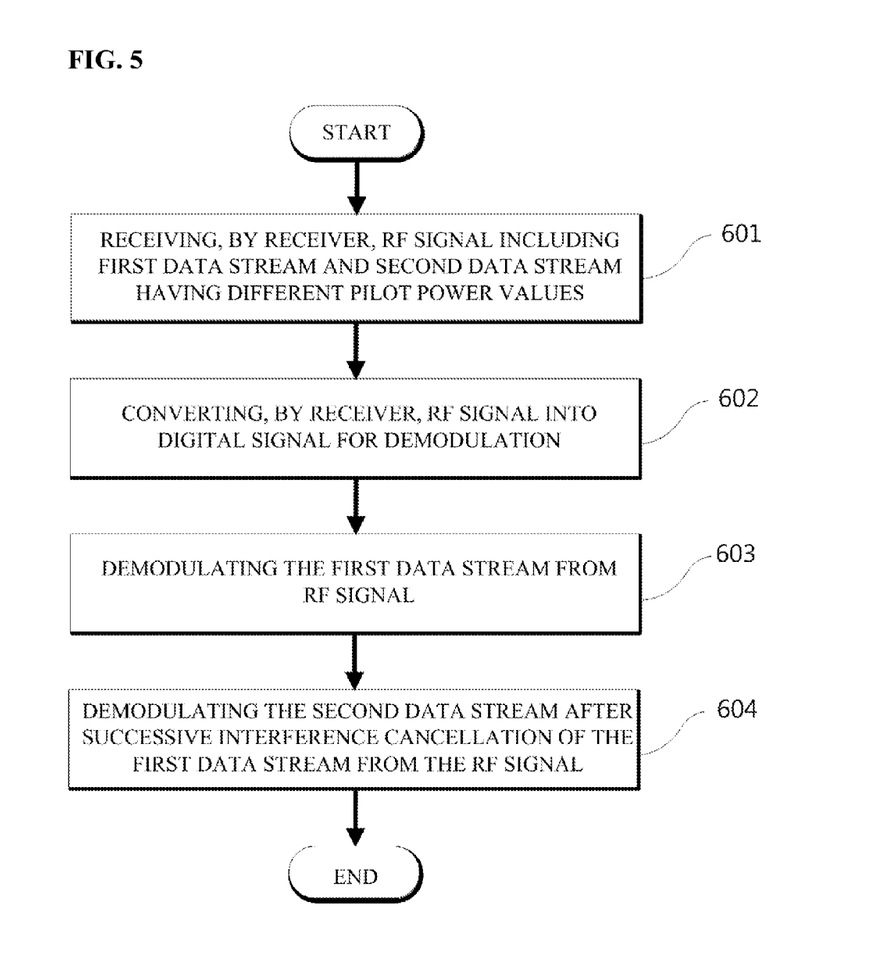
FIG. 5 is a schematic flowchart illustrating an example of a digital signal reception method.

FIG. 5 is a schematic flowchart illustrating an example of a dual digital signal reception method through a single antenna. The dual digital signal reception method through the single antenna includes receiving, by a receiver, RF signals including a first data stream and a second data stream with lowered power level in operation S601, converting, by the receiver, the RF signals into digital signals for demodulation in operation S602, demodulating, by the receiver, the first data stream since the interference of the second data stream to the first stream is negligible in operation S603, and the demodulating, by the receiver, the second data stream after cancelling the interference from the first data stream in operation S604.

In general, a method of receiving and demodulating the digital signals in the receiver may be performed in a reverse order of a process performed in the transmitter. However, in one embodiment, two data streams are overlapped in signals received through an antenna of the receiver, and therefore the interference from the first data stream to the second data stream is cancelled for the second data stream to be demodulated while the first data stream can be simply demodulated since the interference from the lowered second data stream is negligible.

The receiving of operation S601 and the converting of operation S602 correspond to a process performed in a general receiver.

Meanwhile, the RF signals transmitted from the transmitter via a single antenna may be demodulated in an MIMO receiver having two antennas, and demodulated in a signal-input signal-output (SISO) receiver having a single antenna. When a de-mapper is operated in a wide dynamic range between subcarriers in the MIMO receiver having two antennas, demodulation of the data stream may be possible even in the MIMO receiver.

Figure 6:
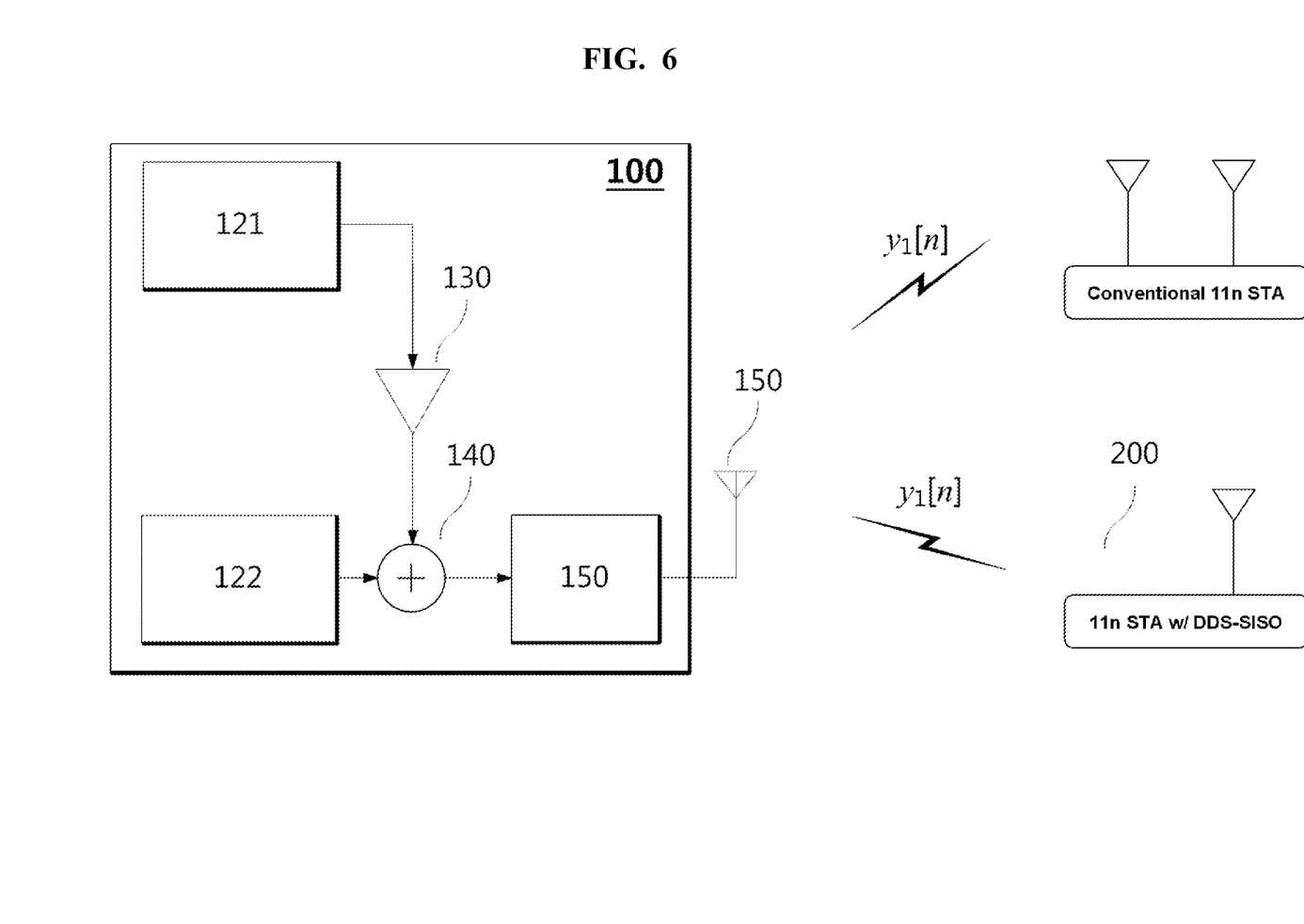
FIG. 6 is a diagram illustrating an example of a process in which a multiple-input multiple-output (MIMO) receiver and a signal-input signal-output (SISO) receiver receive RF signals transmitted by a digital signal transmitter.

FIG. 6 is a diagram illustrating an example of a process in which a multiple-input multiple-output (MIMO) receiver and a signal-input signal-output (SISO) receiver receive RF signals transmitted by a dual digital signal transmitter through a single antenna.

In FIG. 6, an operation in which the SISO receiver having a single antenna as well as the MIMO receiver having two antennas receive the RF signals transmitted from the transmitter 100 is shown. In FIG. 6, a station (STA) is used as the receiver, and a dual data stream (DDS)-SISO refers to SISO that processes a DDS.

However, the reception method and the digital signal receiver which are described in various embodiments may refer to the reception method performed in the SISO receiver and the SISO receiver.

Figure 7:
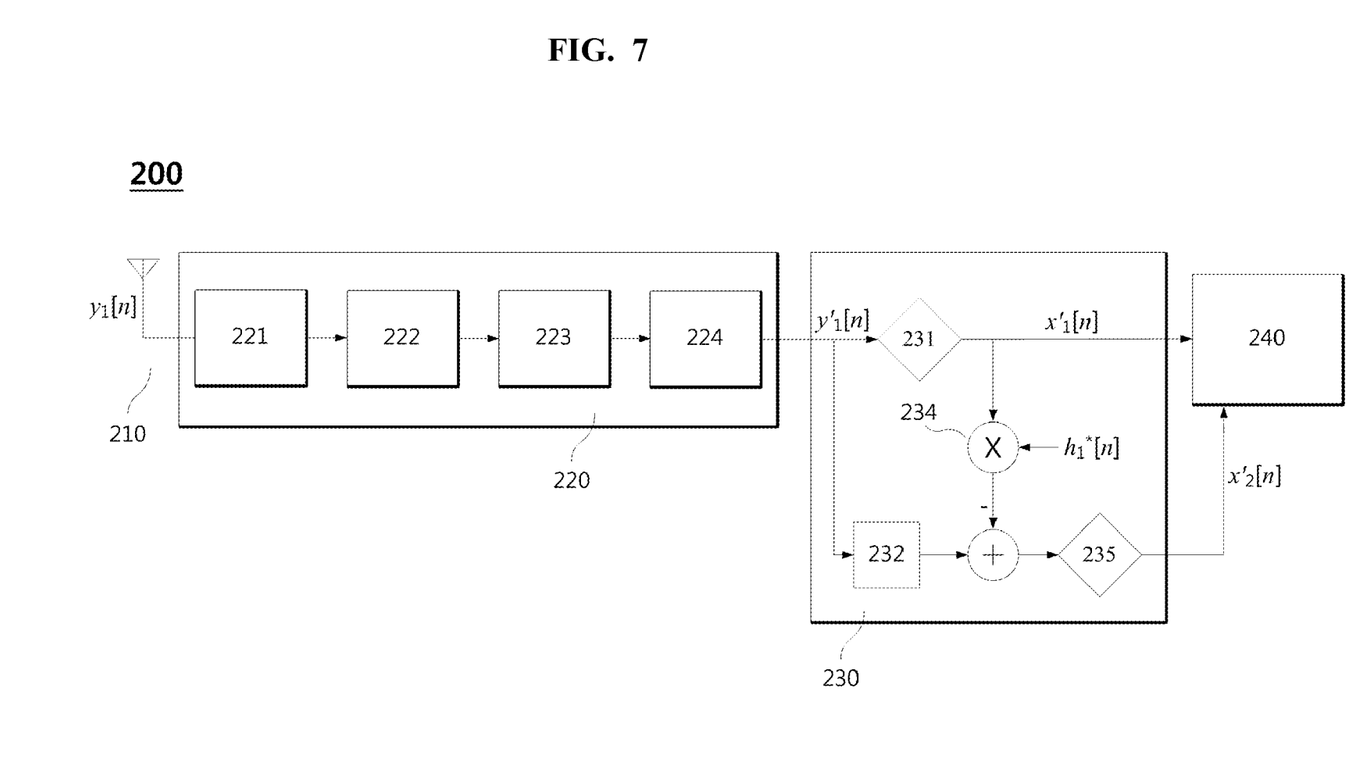
FIG. 7 is a schematic block diagram illustrating an example of a configuration of a digital signal receiver.

FIG. 7 is a schematic block diagram illustrating an example of a configuration of a digital signal receiver. The digital signal receiver 200 includes a reception unit 210 to receive RF signals transmitted from the transmitter 100, a conversion unit 220 to convert the signals received from the reception unit 210 into digital signals, a demodulating unit 230 to separate a first data stream and a second data stream included in the RF signals, and a decoding unit 240 to decode the first data stream and the second data stream in case the dual data streams are the interleaved outputs from a single encoder. A configuration in which the demodulation unit 240 processes the demodulated signals will be omitted.

The reception unit 210, the conversion unit 220, and the decoding unit 240 correspond to a general configuration used in the receiver. The conversion unit 220 includes a down conversion unit 221 to convert signals ($y_1[n]$) entering through an antenna of the reception unit 210 into baseband signals, an ADC unit 222 to convert the baseband signals into digital signals, a GI removal unit 223 to remove a GI from the converted digital signals, and an FFT unit 224 to perform FFT on signals from which the GI is removed.

The demodulation of the first data stream and second data stream of operation S603 and S604 may be performed through the demodulation unit 230. The demodulation unit 230 includes a slicer 231 to demap the first data stream ($x'_1[n]$) from digital signals ($y'_1[n]$) converted in the conversion unit 220, a delay unit 232 to delay the digital signals ($y'_1[n]$), and a subtraction unit 233 to cancel the interference re-modulated from the first stream with a multiplication unit 234 multiplying the channel coefficient conjugate of ($h_1*[n]$). The slicer unit 235 then demaps the second data stream ($x'_2[n]$). In addition, the demodulation unit 230 may use various configurations for separating the first data stream and the second data stream from each other, unlike the extraction unit 230 shown in FIG. 7.

The power ratio between the two data streams can be estimated from the channel coefficients for two data streams by Equation 1 as below. Since two data streams are transmitted via a single antenna, two channel estimation values are proportional to each other by a power attenuation ratio of $\alpha$ which can be enforced to be a real positive number. Thus, a channel estimation value may be more accurately calculated using Equation 2 as below. $h_1(n)$ and $h_2(n)$ are channel estimation values for each data stream.

$$\alpha = \frac{\sqrt{\Sigma_n \|\hat{h}_2(n)\|^2}}{\sqrt{\Sigma_n \|\hat{h}_1(n)\|^2}} \quad \text{[Equation 1]}$$

$$h_1(n) = \frac{\sqrt{\Sigma_n \|\hat{h}_1(n)\|^2} \cdot \hat{h}_1(n) + \sqrt{\Sigma_n \|\hat{h}_2(n)\|^2} \cdot \hat{h}_2(n)}{\Sigma_n \|\hat{h}_1(n)\|^2 + \Sigma_n \|\hat{h}_2(n)\|^2} \quad \text{[Equation 2]}$$

$$h_2(n) = \alpha \cdot h_1(n)$$

In the modulation unit 230 shown in FIG. 7, the first data stream and the second data stream are transferred to the decoding unit 240 to be decoded. Thus, when delay occurs by about 1 clock, the result output from the demodulation unit 230 should compensate for delay of the second data stream in a rear end portion of the modulator unit 230. In this case, the demodulating of operation S603 includes sequentially demodulating the first data stream, and inserting the delay to the first data stream to compensate for delay of the second data stream which occurs through the successive interference cancellation.

Alternatively, unlike the demodulation unit 230 and the decoding unit 240 shown in FIG. 7, the extraction unit 230 may simultaneously extract the first data stream and the second data stream in parallel with a well-established MIMO demapper, and demodulation with respect to the data streams extracted by the demodulation units 240 different from each other may be performed.

As described above, according to the various disclosed embodiments, since two data streams are transmitted and received through a single channel, high data transmission efficiency may be obtained.

In addition, since a data stream is modulated in the transmitter and then signals are converted and processed in a single channel, a simple structure in a hardware complexity may be obtained.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of transmitting dual digital signals through a single antenna among multiple-input multiple-output (MIMO) digital signal transmission methods, the method comprising: receiving, by a transmitter, a first data stream and a second data stream which use the same carrier frequency; modulating, by the transmitter, each of the first data stream and the second data stream; lowering, by the transmitter, a power level of the modulated second data stream; combining, by the transmitter, the modulated first data stream and the second data stream with the lowered power level into one combined signal; and transmitting, by the transmitter, the one combined signal through a single antenna in the same channel.

2. The method of claim 1, wherein the lowering includes lowering, by the transmitter, the power level to a range in which the interference from the second data streams are negligible to the first data stream.

3. The method of claim 1, wherein the modulating includes modulating, by the transmitter, each of the first data stream and the second data stream using a 16 quadrature amplitude modulation (QAM) method, and the lowering includes lowering, by the transmitter, the power level to ¼ or less.

4. The method of claim 3, wherein the lowering includes lowering, by the transmitter, the power level to −13 dB to −14 dB.

5. The method of claim 1, wherein the modulating includes modulating, by the transmitter, each of the first data stream and the second data stream using a quadrature phase shift keying (QPSK) method, and the lowering includes lowering, by the transmitter, the power level to ½ or less.

6. The method of claim 5, wherein the lowering includes lowering, by the transmitter, the power level to −7 dB to −8dB.

7. A multiple-input multiple-output (MIMO) digital signal transmitter comprising: a modulation unit configured to modulate each of a first data stream and a second date stream which use the same carrier frequency; a buffer unit configured to lower the power level of the second data stream output from the modulation unit; an addition unit configured to combine the first data stream output from the modulation unit and the second date stream output from the buffer unit into one combined signal; a conversion unit configured to convert a signal output from the addition unit in a single channel; and a transmission unit configured to transmit the combined signal output from the conversion unit through a single antenna.

8. The transmitter of claim 7, wherein the buffer unit lowers the power level to a range in which the interference from the second data stream is negligible to the first data stream.

9. The transmitter of claim 7, wherein the modulation unit includes:
a first modulation unit configured to modulate the first data stream using a 16QAM method; and
a second modulation unit configured to modulate the second data stream using the 16QAM method.

10. The transmitter of claim 9, wherein the buffer unit lowers the power level of the second data stream output from the second modulation unit to ¼ or less.

11. The transmitter of claim 10, wherein the buffer unit lowers the power level to −13 dB to −14dB.

12. The transmitter of claim 7, wherein the modulation unit includes:
a first modulation unit configured to modulate the first data stream using a QPSK method; and
a second modulation unit configured to modulate the second data stream using the QPSK method.

13. The transmitter of claim 12, wherein the buffer unit lowers the power level of the second data stream output from the second modulation unit to ½ or less.

14. The transmitter of claim 13, wherein the buffer unit lowers the power level to −7 dB to −8dB.

15. The transmitter of claim 7, wherein the conversion unit includes:
an inverse fast Fourier transform (IFFT) unit configured to convert an orthogonal frequency division multiplexing (OFDM) signal of a frequency domain into an OFDM signal of a time domain;
a guard interval (GI) insertion unit configured to insert a guard interval into a signal output from the IFFT unit;
a filter unit configured to filter a signal output from the GI insertion unit;
a digital-to-analog converter (DAC) unit configured to convert a signal output from the filter unit into an analog signal; and
a radio frequency (RF) unit configured to convert a signal output from the DAC unit into an RF signal.

16. A method of receiving a combined signal from a transmitter that receives dual digital signals, wherein a first of the dual digital signals includes a first data stream and a second of the dual digital signals includes a second data stream, modulates each of the first data stream and second data stream, lowers the power level of the second data stream, and then combines the modulated first data stream and second data stream with the lowered power level into the combined signal and transmits the combined signal through a single antenna of a plurality of antennas, the method comprising: receiving, at a receiver, a radio frequency (RF) signal including the combined signal of the first data stream and the second data stream with the lowered power level; converting, by the receiver, the RF signal into a digital signal for demodulation; and without combining the converted combined signal with other received signals, demodulating, by the receiver, the first data stream and the second data stream respectively from the digital signal of the combined signal.

17. The method of claim 16, wherein the power level of the first data stream is 0 dB, and the power level of the second data stream is a value that is lowered to a range in which the interference from the second data stream is negligible to the first data stream.

18. The method of claim 16, wherein, when a modulation type of the data stream is QPSK, the power level of the second data stream is a value lowered to −7dB to −8 dB, and when the modulation type of the data stream is 16QAM, the power level of the second data stream is a value lowered to −13 dB to −14 dB.

19. The method of claim 16, wherein the demodulating includes:
demodulating, by the receiver, the first data stream from the RF signals; and
demodulating, by the receiver, the second data stream after interference cancellation of the first data stream from the RF signals.

20. The method of claim 16, further comprising:
estimating a power ratio of the first and second data streams using the channel coefficient estimates; and
refining the channel estimation value of the first data stream and the second data stream using the estimated power ratio.

* * * * *